April 7, 1959     A. F. ANJESKEY     2,881,271
TROLLEY BAR CONDUCTOR SUPPORT
Filed Nov. 2, 1953     2 Sheets-Sheet 1
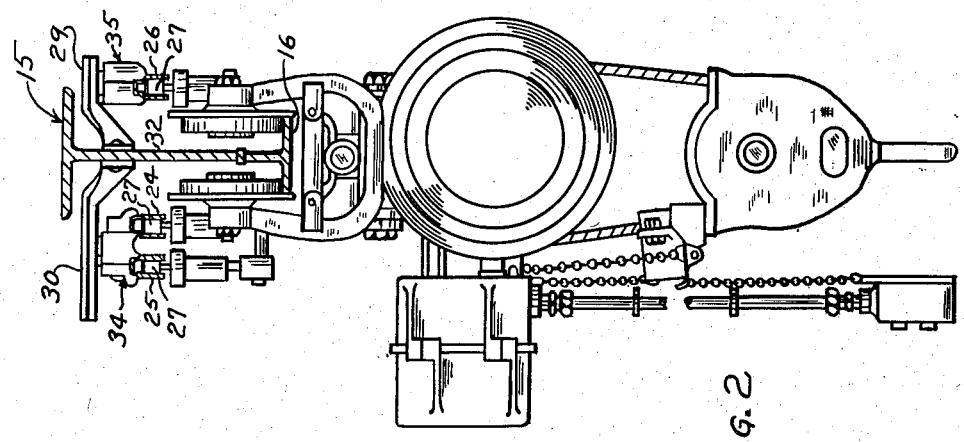
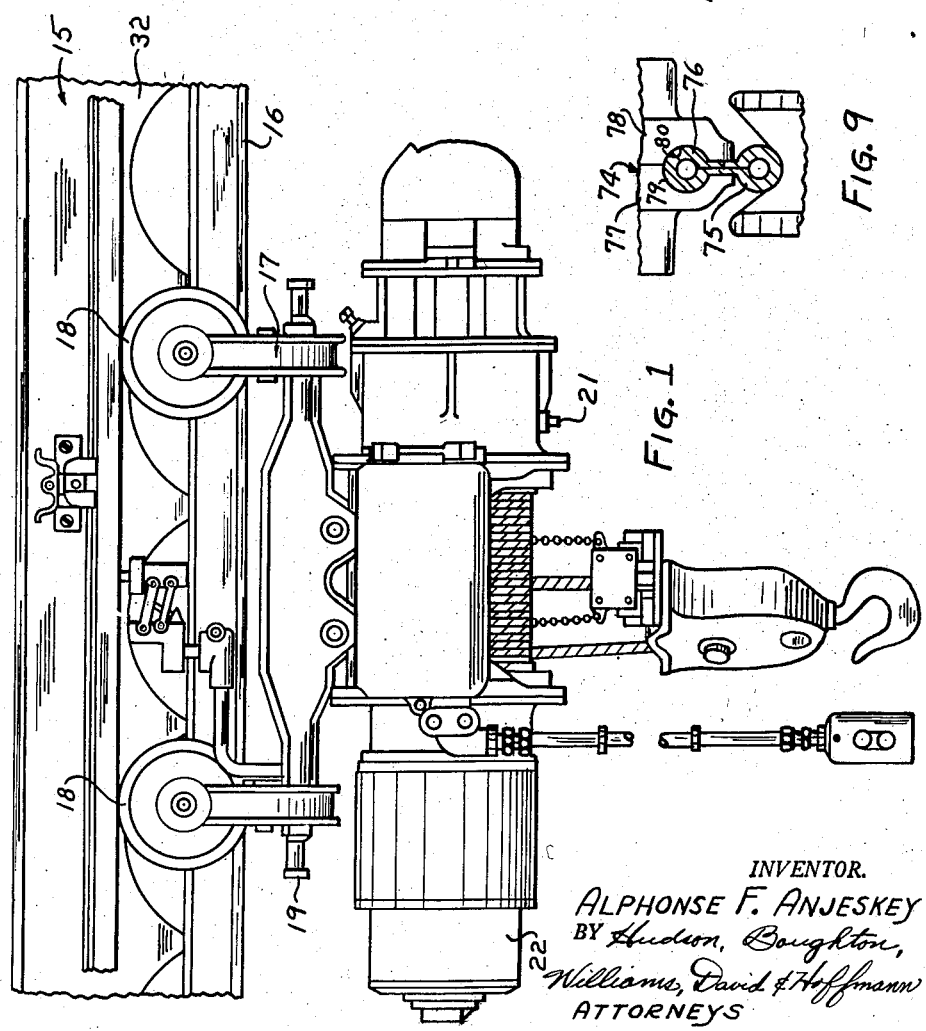
INVENTOR.
ALPHONSE F. ANJESKEY
BY Hudson, Boughton,
Williams, David & Hoffmann
ATTORNEYS April 7, 1959     A. F. ANJESKEY     2,881,271
TROLLEY BAR CONDUCTOR SUPPORT Filed Nov. 2, 1953     2 Sheets-Sheet 2

INVENTOR.
ALPHONSE F. ANJESKEY
BY Hudson, Boughton,
Williams, David & Hoffmann
ATTORNEYS

United States Patent Office 2,881,271
Patented Apr. 7, 1959

2,881,271

TROLLEY BAR CONDUCTOR SUPPORT

Alphonse F. Anjeskey, Cleveland, Ohio, assignor to The Cleveland Crane & Engineering Company, Wickliffe, Ohio, a corporation of Ohio Application November 2, 1953, Serial No. 389,646

1 Claim. (Cl. 191—23)

The present invention relates to a trolley conductor bar support and, more particularly, to a trolley conductor bar support for an electrified, overhead, monorail material handling carrier system.

The principal object of the invention is the provision of a novel and improved support for trolley conductor bars of an electrified, overhead, monorail, material handling carrier system which will comprise a minimum number of parts, be inexpensive to manufacture, rugged in construction and reliable in operation, and which will permit maximum flexibility in arranging the trolley conductor bars.

A further object of the present invention is the provision of a new and improved support for the trolley conductor bar of an electrified, overhead, monorail material handling carrier system comprising, in combination, a support bracket adapted to be mounted on the web of, or otherwise fixed to, the rail supporting the carrier, and a novel mechanical coupling for connecting the conductor bar to the support bracket, the coupling comprising two members so constructed and arranged that it may be disconnected from the support bracket by separating the two members of the coupling.

Another object of the present invention is the provision of a novel and improved coupling for mechanically connecting a trolley conductor bar of an overhead, monorail system to a support bracket, the coupling being comprised of two separable members provided with means for connecting the coupling to the bracket and to the conductor bar to be supported, and being so constructed and arranged that the separation of the two members disconnects the coupling from the conductor bar and from the support bracket.

Another object of the present invention is the provision of a new and improved coupling for mechanically connecting a trolley conductor bar to a support, which has a minimum number of parts and is readily adapted for use in supporting a single conductor bar or a plurality of conductor bars.

The invention resides in certain constructions and combinations and arrangements of parts and further objects and advantages thereof will be apparent to those skilled in the art to which the invention relates from the following description thereof described with reference to the accompanying drawings forming a part of this specification.

Fig. 1 is a side elevational view of a section of an electrified, overhead, monorail system including a hand-propelled electric hoist and embodying the present invention;

Fig. 2 is a vertical sectional view through the monorail of the system of Fig. 1 and the trolley conductor bars mounted on the monorail and showing the hand-propelled electric hoist in end elevation;

Fig. 9 is a fragmentary view of a portion of a modified coupling for supporting a trolley conductor bar having a cylindrical support head.

Figure 3:
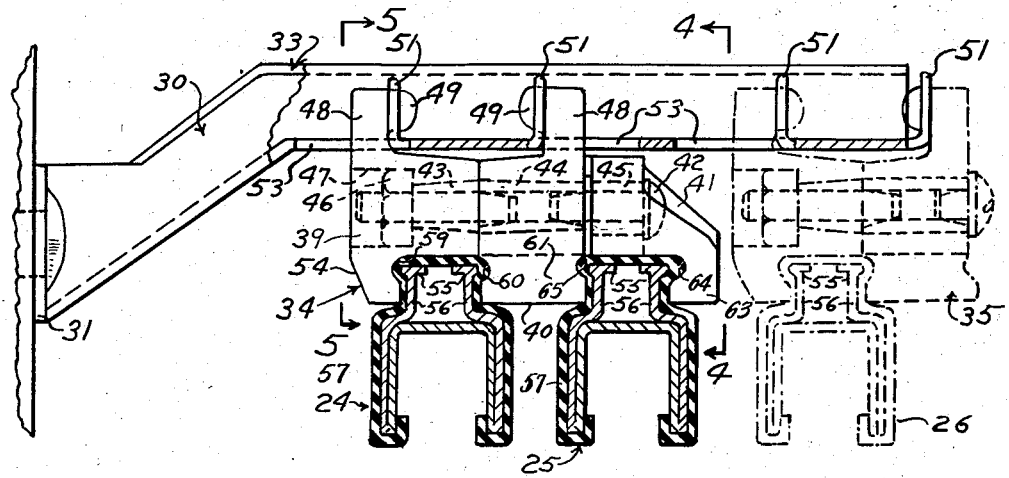
Fig. 3 is a fragmentary elevational view with parts in section, of a support for trolley conductor bars embodying the present invention.
Figures 4, 5:
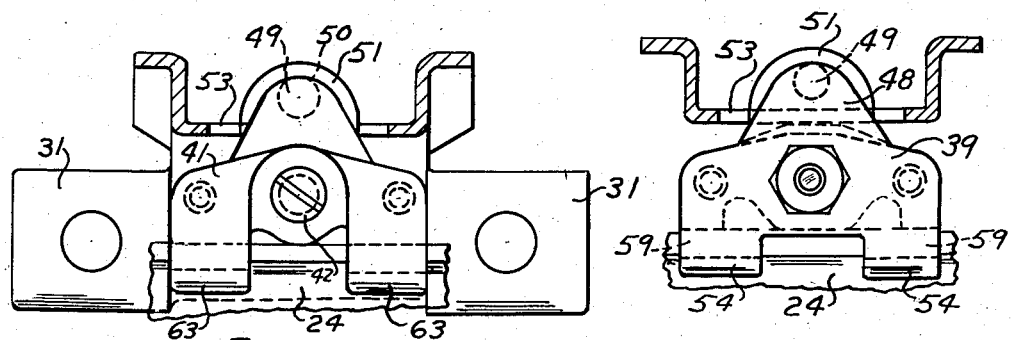
Fig. 4 is a view taken along line 4—4 of Fig. 3.
Fig. 5 is a view taken along line 5—5 of Fig. 3.
Figure 7:
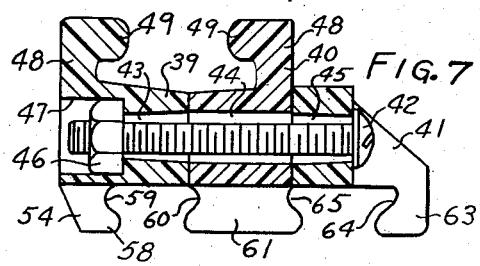
Fig. 7 is a sectional view taken along line 7—7 of Fig. 6.
Figure 6:
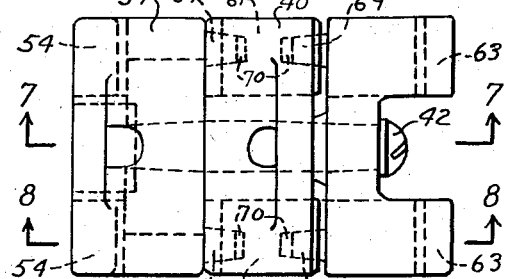
Fig. 6 is a detached plan view of the coupling shown in Fig. 3.
Figure 8:
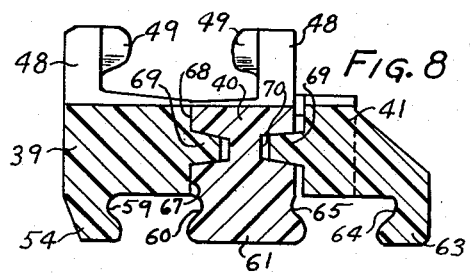
Fig. 8 is a sectional view taken along line 8—8 of Fig. 6.

While the present invention is susceptible of various modifications and constructions and of use in various types of monorail systems and the like where it is desirable to provide a support for a longitudinal conductor bar, it is herein shown and described as embodied in an overhead, monorail, material handling system having a hand-propelled electric hoist movable along the monorail for lifting and transporting materials from one location to another.

Referring to the drawings, the system generally comprises a monorail 15 having lower, horizontal flange portions 16 upon which a movable carrier 17 is supported by spaced sets of flanged wheels 18 for movement along the rail from one location to another. The carrier 17 is provided with a load bar 19 suspended between the two sets of wheels 18 for dependingly supporting an electric hoist 21 which includes an electric motor 22 for rotating the cable drum. The power for the electric motor 22 is supplied from longitudinal conductor bars 24, 25, 26 mounted alongside the monorail 15. In the system illustrated, the motor is of the three-phase type and, therefore, three conductor bars are provided. The power is transferred from the conductor bars to the electric motor by three collector shoes 27, which are mounted on the carrier 17 and engage the respective conductor bars. The system thus far described is conventional and forms no part of the present invention.

The present invention contemplates a novel and improved means for supporting the conductor bars or sections thereof alongside the monorail 15 and accordingly provides support brackets 29, 30 preferably made of metal and each having laterally extending, vertical flange members 31 for securing the bracket to the web 32 of rail 15. The brackets 29, 30 each comprises an arm 33 extending generally horizontally from the vertical flange members 31. The conductor bars 24, 25, 26 are connected to arm 33 by couplings 34, 35 made of molded plastic or other suitable insulating material, the coupling 34 connecting the bars 24, 25 to the bracket 30 and the coupling 35 connecting the bar 26 to the bracket 29. In Fig. 3 the coupling 35 is shown, for purposes of illustration, as connected to the support bracket 30 for supporting the conductor bar 26 on the same side of rail 15 as the bars 24, 25 inasmuch as brackets 29 and 30 are identical. This also illustrates how three or more bars may be supported from the same support bracket.

The coupling 34 for connecting the conductor bars 24, 25 to the support bracket 30 comprises three separable members 39, 40, 41 positioned side by side, the body member 40 being intermediate the members 39, 41. The members are secured together by a bolt 42 which passes through aligned bores 43, 44, 45 in the members 39, 40, 41 respectively. The bolt 42 threads into a nut 46 located in a recess 47 in the outer or left hand side of the member 39 as viewed in Fig. 3.

The body portions of the members 39, 40 each have an ear or projection 48 extending upwardly therefrom toward and through the arm 33 of the bracket 30. The ears are each provided with an inwardly projecting portion or projections 49 adapted to be received by an opening 50 in the outside surface of a lug 51 extending vertically from the horizontal arm 33 of the bracket 30.

In the illustrated embodiment the openings 50 extend through the lugs 51. The pair of lugs 51 for receiving the portions 49 of coupling 34 are spaced along a line generally transverse to the length of the conductors to be connected to the bracket. The lugs 51 may be formed by striking out a portion of the arm 33 and bending the struck-out portion of the arm 33 upwardly to provide the lugs 51 as well as providing openings 53 in the arm 33 through which the ears 48 of the coupling 34 may pass. The openings 53 are of a size to allow sufficient movement of the ears 48 in a direction away from their respective lugs 51 to permit the withdrawal of the projecting portions 49 from the apertures 50. The horizontal arm 33 may be provided with more than one set of spaced lugs 51 depending on the number of couplings to be used. The bracket as illustrated in Fig. 3 is provided with two pairs of such lugs.

The body portion of the member 39 overlies the conductor bar 24 and a flange portion or projection 54 depending from the left hand side of the body portion of the member 39 is adapted to provide a support surface for the conductor bar 24. The trolley conductor bars per se form no part of the present invention and may be of any suitable construction with or without an insulating sheath. Preferably, however, the conductor bars 24, 25, 26, as illustrated in Fig. 3, are of uniform cross-section throughout their length and each comprises an inverted channel having a pair of horizontal flanges 55 supported above the bottom of the inverted channel by parallel, longitudinal, vertical walls 56. The flanges 55 extend outwardly from the vertical walls 56 on opposite sides of the conductor and provide supporting surfaces or grooves for the conductor bar. The conductor bar shown is provided with an insulating sheath 57 to assist in preventing short-circuits and to minimize the danger of persons accidentally contacting the conducting surfaces of the bar.

The depending flange portions 54 of the body portion of the member 39 are each provided with an inturned projection 58 forming with the body of the member a longitudinal groove or depression 59 adapted to receive the left hand flange 55 of the conductor bar 24 as viewed in Fig. 3. The right hand flange of the conductor bar 24 is received in a similar groove or depression 60 in the left hand side of each of two depending portions 61 of the intermediate body member 40. It may be seen that the members 39, 40 cooperate to form a channel along the underside thereof to receive and support the flanges 55 of the conductor bar 24.

The support flanges 55 of the conductor bar 25 are received in a similar channel formed by the members 40, 41. The body portion of the member 41 overlies the conductor bar 25 and is provided with depending flange portions 63 each having a longitudinal groove or recess 64 therein adapted to receive the right hand support flange 55 of the conductor bar 25 as viewed in Fig. 3. The left hand support flange 55 of conductor bar 25 is received in a similar groove 65 in the right hand side of depending portions 61 of the intermediate member 40. While the members 39, 40, 41 have been described as having depending portions or depending flange portions, it is understood that the depending portions of each member could be joined to provide a continuous portion rather than a pair of depending portions as shown and described.

From the above description it can now be seen that the conductor bars 24, 25 may be connected to the bracket 33 by simply assembling the three members 39, 40, 41 and securing them together by a single bolt. To aid in properly assembling the members 39, 40, 41 the adjacent sides of the members are provided with interfitting parts which permit separation of the members along a line generally transverse to the length of the conductor bars 24, 25. To this end the inner sides 67, 68 of the body portions of the members 39 and 41, respectively, are each provided with pins 69 adapted to be received in apertures 70 in the respective adjacent sides of the portion of the member 40. The members 39, 40, 41 may be so proportioned that the depending portions exert a clamping pressure on the conductor bars 24, 25, or the proportioning may be such that the conductor bars are supported solely by reason of the fact that the support flanges of the bars are trapped in the grooves in the depending portions of the members.

If it is desired to connect a single conductor bar to the support bracket 30 the third member 41 may be eliminated. The coupling 35 illustrated in Fig. 3 is of this type and is shown connecting the conductor bar 26 to the bracket 30.

The couplings 34, 35 may be modified, as necessary, to support various types of trolley conductor bars. Fig. 9 illustrates a modified coupling 74 for supporting a single trolley bar 75 having a longitudinal, cylindrical, support head 76. The coupling 74 comprises separable members 77, 78 corresponding to members 39, 40, respectively, of coupling 34. The adjacent sides of members 77, 78 are provided with longitudinal, generally semicylindrical recesses 79, 80, respectively, for receiving the head 76 of bar 75. The remainder of the structure of members 77, 78 may be of the same construction as that of members 39, 40, respectively, of couplings 34 and 35.

A coupling embodying the present invention is particularly suitable for use in connecting uninsulated conductor bars to a support bracket since the coupling may be easily molded from a non-conducting material. It is readily apparent from the above description that the members of a coupling made from an insulating material may be assembled and utilized to connect a conductor bar to a metallic bracket without employing a metallic connection between the conductor bar and the coupling or between the coupling and the bracket. This feature especially in conjunction with the use of an insulating sheath for the conductor bar greatly reduces the possibility of short circuits and also the danger of accidental contact by persons with conducting portions of the system.

It is also apparent from the above description that the present invention provides a support for a conductor bar of an electrified, overhead, monorail system which comprises a minimum number of parts, is inexpensive to manufacture, is rugged in construction, is readily assembled to facilitate the connection of the conductor bar to the support bracket, minimizes the danger of short circuits, and permits maximum flexibility in arranging trolley conductor bars.

While preferred embodiments of the invention have been described in considerable detail, the invention is not limited to the particular construction shown, and it is our intention to hereby cover all adaptations, modifications and arrangements which come within the practice of those skilled in the art to which the invention relates and within the scope of the following claim.

Having thus decribed my invention, I claim:

In an electrified, overhead material handling carrier system, a carrier rail comprising a central vertical web having longitudinally extending transverse flanges along its lower edge adapted to be engaged by the wheels of a carrier, a conductor bar having outwardly facing longitudinally extending grooves disposed on opposite sides thereof in a common horizontal plane, a rigid bracket fixed with respect to and projecting outwardly of said rail above said flanges, said bracket having vertically projecting spaced lugs with aligned apertures therein, a pair of clamp members having body portions in full body abutting engagement, projections on each of said members spaced from the side thereof adjacent to the other member and extending from said body portion in opposite directions generally parallel with said side, each of said projections having portions spaced from the body portion of said member of which it is a part and extending in the general direction of said side of said member of which it is a part adjacent to said other member, one of said last-named portions of each member projecting into one of said grooves in said conductor bar and the other into one of said apertures in said bracket, means for preventing angular movement between said members, and means for detachably fastening said members together.

References Cited in the file of this patent

UNITED STATES PATENTS

| | | | |
|---|---|---|---|
| 935,895 | Couch | Oct. 5, | 1909 |
| 1,014,569 | Couch | Jan. 9, | 1912 |
| 1,076,211 | Korns | Oct. 21, | 1913 |
| 1,401,650 | Schaake | Dec. 27, | 1921 |
| 1,404,900 | Schaake | Jan. 31, | 1922 |
| 1,420,407 | Bower | June 20, | 1922 |
| 1,722,291 | Hanak | July 30, | 1929 |
| 2,137,694 | McCain | Nov. 22, | 1938 |
| 2,452,406 | Volkery et al. | Oct. 26, | 1948 |
| 2,596,022 | Genter | May 6, | 1952 |
| 2,677,020 | Genter | Apr. 27, | 1954 |

FOREIGN PATENTS

| | | |
|---|---|---|
| 561,378 | France | Aug. 4, 1923 |
| 364,317 | Great Britain | Jan. 7, 1932 |
| 226,150 | Switzerland | June 16, 1943 |